United States Patent Office 3,010,983
Patented Nov. 28, 1961

3,010,983
VINYLARSENIC AND ANTIMONY COMPOUNDS AND METHODS OF PREPARATION THEREFOR
Hugh E. Ramsden, Scotch Plains, N.J., assignor to Metal & Thermit Corporation, Woodbridge Township, N.J., a corporation of New Jersey
No Drawing. Filed July 12, 1957, Ser. No. 671,372
11 Claims. (Cl. 260—440)

The present invention relates to novel vinylicarsenic and vinylicantimony compounds, and to a process for preparing the same. It has now been discovered that novel vinylicarsenic and vinylicantimony compounds can be prepared by a novel, efficient and economical process. This application is a continuation-in-part of Serial No. 549,571, filed November 28, 1955 which in turn was a continuation-in-part of Serial No. 520,145, filed July 5, 1955, both now abandoned.

It is an object of the present invention to provide novel vinylicarsenic compounds.

It is another object of the present invention to provide novel vinylicantimony compounds.

It is also an object of this invention to provide a novel process for preparing vinylicarsenic and vinylicantimony compounds.

Generally speaking, the present invention embodies novel vinylicarsenic and vinylicantimony compounds having the general formula:

(1)     $Vi_nR_aB'_bMX_{3-(n+a+b)}$ wherein M is selected from the class consisting of arsenic and antimony; $n=1$, 2 or 3; $a$ and $b=0$ or 1; $n+a+b$ may not total more than 3; Vi is a vinylic radical; R and R′ may be the same or different and are selected from the group consisting of alkyl, cycloalkyl, alkandiyl, cycloalkandiyl, alkenyl, alkadienyl, cycloalkenyl, alkynyl, cycloalkadienyl, aryl, aralkyl, and active-hydrogen-free heterocyclic radicals, and X is a halogen selected from the group consisting of iodine, bromine, chlorine and fluorine. The R groups may be cyclized. The aryl radicals include fused ring and condensed radicals. The term "vinylic radical" (Vi) is used herein to denote structures of the type:

(2) 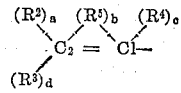

where the No. 1 carbon is bonded to arsenic or antimony R″, R‴ and R″″ may be hydrogen and are further defined as is R above. The hydrocarbon radicals may be unsubstituted or carry functional groups inert to magnesium or vinylic magnesium chlorides under these conditions. The vinylic radical also includes cycloalkenyls having the following general type structure:

(3)
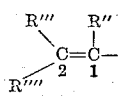

where $l$ is a whole number greater than 1. By the term "active-hydrogen-free heterocyclic radical," all heterocyclic radicals except those containing hydrogen attached to nitrogen or oxygen, or containing other groups reactive with the organic magnesium chlorides, are included.

More specifically compounds encompassed by the present invention may be described by the general formula:

(3a)     $Vi_nR_aR'_bMX_{3-(n+a+b)}$ wherein $n$ is a whole number from 1 to 3, $a$ and $b$ are whole numbers from 0 to 2, wherein the sum of $n+a+b$ does not exceed 3; M is selected from the class consisting of arsenic and antimony; X is a halogen selected from the class consisting of iodine, bromine, chlorine and fluorine; R is a radical selected from the class consisting of alkyl having up to 30 carbon atoms in the alkyl chain, aryl radical having up to 3 rings in the aryl radical and no more than 48 carbon atoms in the radical, cycloalkyl radicals having up to 8 carbon atoms in the cycloalkyl ring, heterocyclic radicals containing up to 3 rings in the radical and no more than 48 carbon atoms in the radical and containing as the heterocyclic atoms only elements selected from the class consisting of oxygen, sulfur and nitrogen; R′ has the same values ascribed above for R with the further stipulation that it may comprise a divalent aliphatic hydrocarbon radical containing no more than 6 carbon atoms in the chain, each valence of which is bonded to M; and Vi is a vinylic radical having from 2 to 30 carbon atoms in the radicals and having the following structural formula:

(3b)
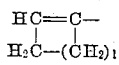

wherein no more than 2 valence bonds indicated by the dotted lines in the above formula are bonded to the $C_2$ atom, and no more than 1 valence bond indicated by the doted line in said formula is bonded to the $C_1$ atom, wherein $R^2$, $R^3$ and $R^4$ are monovalent hydrocarbon groups having up to 28 carbon atoms, and $R^5$ is a divalent saturated aliphatic hydrocarbon radical having up to 8 carbon atoms in the chain, and $a$, $b$, and $c$, and $d$ are whole numbers from zero to 1, wherein the sum of $a+b+c+d$ is a whole number from 2 to 3, and wherein when $b$ equals zero the sum of $a+c+d$ equals 3, and wherein when $b$ equals 1 the sum of $a+b+c+d$ equals 2, and wherein when any of the subscripts $a$, $c$ and $d$ are zero a hydrogen replaces the corresponding radical in the formula.

The process for producing the novel vinylic compounds comprises reacting a vinylicmagnesium chloride with a compound selected from the class consisting of organoarsenic halides, organoantimony halides, arsenic trihalides and antimony trihalides to produce vinylic arsenic or antimony compounds in accordance with the following equation:

(4) 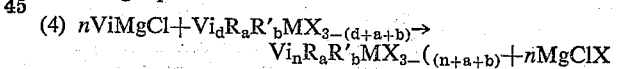

wherein $n=1$, 2 or 3; $d=0$, 1 or 2; $a$ and $b=0$ or 1; $d+a+b$ may not be greater than 2; $n+a+b$ may not be greater than 3; Vi and X have the same significance ascribed to them above; R and R′ are the same or different and have the same meaning given to them above. The following type compounds are the products included within the general formula for the vinylicarsenic or vinylicantimony product above: $Vi_3M$, $Vi_2RM$, $Vi_2MX$, $ViRR'M$, $ViRMX$, $ViMX_2$. As illustrated in the foregoing Equation 4, the organoarsenic or organoantimony halide reactant may contain one or two vinylic groups bonded to the metal atom. If so, said reactant was also made in accordance with the present process.

An aspect of the present process is illustrated in the following equation:

(5) 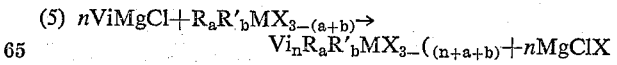

wherein $n=1$, 2 or 3; $a$ and $b=0$ or 1; the sum of $n+a+b$ being not greater than 3; the sum of $a+b$ may not be greater than 2; Vi and X have the same significance ascribed to them above; and R and R′ are the same or different and have the same meaning ascribed to them above. The process may be so controlled that any of the aforementioned products or a mixture of products may be produced. It is also possible to carry out the reaction stepwise by first reacting a vinylicmagnesium chloride with an organoarsenic or organoantimony halide not containing vinylic radicals or with arsenic or antimony trihalide, and then further reacting the product of this reaction with a vinylicmagnesium chloride as is included in Equation 4 herein.

The novel vinylicarsenic and vinylic antimony compounds may also be prepared by reacting a vinylicarsenic or vinylicantimony halide containing at least one vinylic group bonded to the metal atom with an organomagnesium halide (preferably the chloride). Thus, diphenylvinylarsine may be produced by reacting vinylicarsenic dichloride with phenylmagnesium chloride. Of course, the vinylarsenic halide utilized as a reactant is produced by the process of this invention, as illustrated in Equation 4. The use of this two-step procedure is advantageous in certain cases where it will result in mixtures of reaction products and reactants which are more easily separated than would be mixtures resulting from the one step process illustrated in Equation 4.

When the vinylicmagnesium chloride is reacted with the halogen-containing arsenic or antimony compound, the product may be any of the type compounds listed herein before (as products) or any mixture of them, dependent upon the reactants used, the relative proportions of the reactants used, and the process conditions. The reaction product will usually be a mixture of 2 or 3 of the above products. However, by control of the variables, it is possible to produce a product containing a preponderance of a desired reaction product. A single product may be obtained when using a mono-halogen arsenic or antimony compound as the metal containing reactant or a sufficient excess of ViMgCl with $MX_3$, $RMX_2$, $R_2MX$ to give $Vi_3M$, $Vi_2RM$ and $ViR_2M$, respectively.

The process is usually carried out by dissolving the metal containing reactant in an organic solvent. In certain cases, this need not be done, e.g., vinylantimony dichloride can be prepared by adding vinylmagnesium chloride to an excess of antimony trichloride. Vinylic magnesium chloride (usually in a solution of cyclic ether, Q, more particularly hereinafter defined) is added to the solution of metal halide preferably with agitation. A reaction will usually start immediately. If all of the halogen is to be replaced, the organometal halide or metal halide may be added to the vinylic magnesium chloride solution. The reaction temperature will vary with the reactants and solvents utilized and the products desired and will usually be between room temperature and the reflux temperature of the reaction mixture. The reaction is usually exothermic. For special conditions, it may be necessary to carry the reaction out, at low temperatures or under reduced pressures. The reaction is preferably carried out in an inert atmosphere, usually nitrogen. The reaction products include one or more of the vinylicarsenic or vinylicantimony compounds and a magnesium halide salt cake which may be separated by conventional means, e.g., filtration, drowning in and extraction by acidified water, crystallization, etc. The solvents are usually removed by distillation. When the products include more than one vinylicarsenic or vinylicantimony compound, they may be separated by conventional separatory techniques.

The vinylicmagnesium chlorides are prepared as disclosed in U.S. Patent application No. 549,517 now abandoned.

Compound Q referred to above, is a substituted or unsubstituted non-aromatic heterocyclic oxygen compound having from 5 to 6 atoms in the heterocyclic ring, and only one oxygen in said heterocyclic ring. The other ring atoms of said heterocyclic ring are carbon with the exception that a substituted ring nitrogen, substituted preferably with an alkyl radical having up to 6 carbon atoms in the alkyl chain, may replace a carbon atom in said heterocyclic ring which is not adjacent said oxygen atom in the ring. A further requirement for compound Q is that said heterocyclic ring is of a non-aromatic character, that is, that it does not contain a cyclic conjugated system of bonding within the heterocyclic ring. Preferably, said compound Q contains not more than one unsaturation between carbon atoms of said heterocyclic ring, which is an ethylenic unsaturation. A further requirement for compound Q is that it be unsubstituted, except for hydrogen, at at least one carbon atom which is adjacent said oxygen atom in said heterocyclic ring. The heterocyclic ring of compound Q may carry any substituents which are not reactive with the reactants and the reaction products, under the conditions of reaction, for the preparation of the vinylicmagnesium chloride. By way of illustration the following substituents may be mentioned: alkyl, aryl, alkoxy, aryloxy; $-CH_2OR''$ is alkyl, preferably having up to 6 carbon atoms or $-(CH_2-CH_2-O)_xR'''$ wherein $x$ is a whole number from 1 to 8 and $R'''$ is alkyl, preferably having up to 6 carbon atoms;

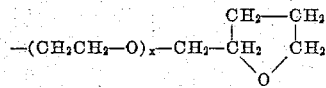

wherein $x$ is a whole number from 1 to 8; and

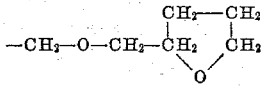

In a preferred form of this invention the substituents on said compound Q, aside from hydrogen, occur only at the number 2 position of said non-aromatic heterocyclic ring system and do not contain more than 75 atoms in the group.

Q may function as a solvent in this present process. If it is used as a solvent, a high melting point (e.g., about 90° C.) will cause difficulty in carrying out the reaction. For this reason it is advantageous to use a liquid Q, i.e., liquid below 90° C.

It will be noted from the above that an essential feature of the compound Q is that it be non-aromatic in character. Another feature of compound Q is that it be free of substituents except for hydrogen, at at least one carbon atom which is adjacent the oxygen atom of the heterocyclic ring. These features are essential in order to make the free p-electrons on said oxygen atom available for coordination and complex formation with magnesium. The presence of substituents, aside from hydrogen, on both carbon atoms adjacent the oxygen atom of said heterocyclic ring restricts the availability of the free p-electrons of said oxygen for donation and complex formation, whereas substituents on only one of said carbon atoms does not. The presence of substituents in other positions on the heterocyclic ring does not affect the availability of electrons on said oxygen for coordination and complex formation. The free p-electrons on oxygen atoms which constitute part of a heterocyclic ring system possessing aromatic characteristics are also not available for coordination and complex formation. The "aromaticity" of certain heterocyclic compounds is well known phenomenon. This phenomenon is associated with the cyclic conjugated system of bonding which is characteristic of these heterocyclic compounds. Thus, furan, which is known to be aromatic in character, is not operative as a compound Q, whereas dihydropyran, which contains a single unsaturated bond is operative as a compound Q for the purposes of this invention. This is explained on the basis of the resonance of the respective compounds. Furan exhibits a p-pi aromatic resonance as a result of which the electron distribution is such that the free p-electrons of the oxygen atom are not available for coordination and complex formation. Dihydropyran, on the other hand exhibits only an ethylenic p-pi resonance in which the free p-electrons are still available for coordination and complex formation thus rendering it operative for the present purpose.

By way of illustration heterocyclic oxygen compounds included within the definition of compound Q are as follows: tetrahydrofuran, tetrahydropyran, 2-methyltetrahydrofuran, 2-ethoxytetrahydropyran, tetrahydrofurfuryl ethyl ether, dihydropyran, N-methylmorpholine, ditetrahydrofurfuryl ether and ethers of general formula

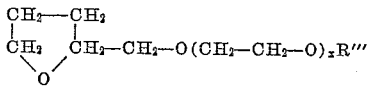

wherein R''' is an alkyl group having from 1 to 6 carbon atoms in the alkyl radical or the group

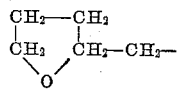

and $x$ is a whole number from 1 to 8.

In a preferred form of this invention the vinylicmagnesium chloride is employed in the form of a solution in compound Q. This is preferred since this reagent may be readily and economically prepared by the reaction of the vinylic chloride with magnesium in the presence of compound Q. The solutions thus prepared may be used as a reactant in the present process. However, the vinylicmagnesium chloride may also be used in the process of the present invention when dissolved in other inert solvents, e.g., ethylene polyethers, heptane, cyclohexane, toluene, etc. These solutions are prepared by the displacement of compound Q from solutions of the vinylic magnesium chlorides—compound Q solutions by the above mentioned inert solvents. The vinylic magnesium chloride may also be used in accordance with this invention in the form of a solution in a mixture of compound Q and an inert solvent mentioned supra.

The solvents utilized in the process must be inert to other components of the reaction mixture under the process conditions and are preferably organic solvents that distill below 150° C. The preferred solvents include substituted and unsubstituted tetrahydrofuran, tetrahydropyran, heptane, hexane, pentane, cyclohexane, octane, isooctane, cumene, xylene, toluene, benzene, etc. As noted above, a solvent system containing more than one component may also be used. A preferred solvent system is that containing tetrahydrofuran and hydrocarbon solvent e.g., saturated aliphatic, saturated cyclic aliphatic or aromatic solvent. Almost all of the reaction mixtures utilized will contain tetrahydrofuran or an equivalent material, designated as compound Q, complexed with the vinylicmagnesium chloride.

The following examples are illustrative of the present invention, however, it will be understood that the invention is not limited thereto.

*Example 1.—Trivinylarsenic*

In a 5 liter flask was placed 121 grams (0.667 mole) of arsenic trichloride in 1 liter of pentane. To this was added, at a rate to maintain gentle reflux, 2.4 moles of vinylmagnesium chloride in 864 ml. of tetrahydrofuran solution. The reflux continued spontaneously until 2.2 moles of vinylmagnesium chloride was added. On completion of addition (4 hours), the reaction mixture was refluxed for an additional two hours and allowed to stand overnight. The solution was filtered from the salt-containing reaction mixture under nitrogen. Water was added to the salt, thus causing an organic layer, and an aqueous layer containing a dispersed solid phase to form. The organic layers were separated, dried, and decanted. The aqueous layer was acidified causing the solid phase to dissolve leaving an organic layer and an aqueous layer. The organic phases were combined and fractionally distilled. The yield of trivinylarsenic was 39.6%. The compound distills at 122–124° C./760 mm. Theoretical As, 48.0%; found, 47.76%.

*Example 2*

Following the procedure of Example 1, 1-buten-1-ylmagnesium chloride is reacted with AsCl₃ to yield tris-1-buten-1-ylarsine.

*Example 3*

To one mole of butylarsenic dichloride in cyclohexane solution is slowly added two moles of vinylmagnesium chloride in tetrahydrofuran solution. After completion of the addition, the reaction mixture is refluxed, cooled, hydrolyzed, and the organic matter separated. Divinylbutylarsine is recovered from the organic material.

*Example 4*

To one mole of octadecylarsenic dichloride in heptane solution is slowly added two moles of vinylmagnesium chloride in tetrahydrofuran solution. After completion of addition, the reaction mixture is refluxed, cooled and hydrolyzed, and the organic matter separated. Divinyloctadecylarsine is recovered from the organic material.

*Example 5*

To one mole of dimethylarsenic chloride in heptane solution is slowly added one mole of vinylmagnesium chloride in tetrahydropyran solution. After completion of addition, the reaction mixture is held at reflux for additional time, cooled, hydrolyzed, and the organic material separated. Vinyldimethylarsine is recovered from the organic material.

*Example 6*

To one mole of dioctylarsenic chloride in heptane solution is slowly added one mole of vinylmagnesium chloride in 2-methyltetrahydrofuran solution. After completion of addition, the reaction mixture is held at reflux for additional time, cooled, hydrolyzed, and the organic material separated. Vinyldioctylarsine is recovered from the organic material.

*Example 7*

To one mole of diphenylarsenic bromide in benzene solution is slowly added one mole of vinylmagnesium chloride in tetrahydropyran solution. After completion of addition, the reaction mixture is held at reflux for additional time, cooled, hydrolyzed, and the organic material separated. Vinyldiphenylarsine is recovered from the organic material.

*Example 8*

To one mole of di(p-chlorophenyl)arsenic chloride in toluene solution is added one mole of 3-methyl-1-butenylmagnesium chloride in tetrahydrofuran. After completion of addition, reflux is continued and then the reaction mixture cooled, hydrolyzed, and the organic material separated. 3-methyl-1-butenyldi(p-chlorophenyl)-arsine is recovered from the organic material.

*Example 9*

To one mole of 6-quinolylarsenic dibromide is added two moles of isocrotyl magnesium chloride in tetrahydrofuran, at gentle reflux. After completion of addition, the reaction mixture is refluxed for two hours, cooled, hydrolyzed and the organic material separated. Di(isocrotyl)6-quinolylarsine is recovered from the organic material.

*Example 10*

To one mole of 4-methyl-1-naphthylarsenic dichloride is added two moles of α-fluorovinylmagnesium chloride in tetrahydrofuran, while maintaining gentle reflux. The reaction mixture is then additionally refluxed, cooled and hydrolyzed, and the organic material separated. Di(α-fluorovinyl)4-methyl-1-naphthylarsine is recovered from the organic material.

*Example 11*

To one mole of cyclophentamethylenearsenic chloride in cyclohexane solution is added one mole of vinylmagnesium chloride in tetrahydrofuran, while maintaining gentle reflux. The reaction mixture is then additionally refluxed, cooled, hydrolyzed, and organic material separated. Vinylcyclopentamethylenearsine is recovered from the organic material.

Example 12

To one mole of ethyl(5-methylthienyl)arsenic chloride in benzene is added one mole of vinylmagnesium chloride in tetrahydrofuran, while maintaining gentle reflux. The reaction mixture is additionally refluxed, cooled, hydrolyzed, and the organic material separated. Vinylethyl-5-methylthienyl arsine is recovered from the organic material.

Example 13

To one mole of arsenic trichloride in heptane is slowly added two moles of vinylmagnesium chloride in tetrahydrofuran. The mixture is stirred until the reaction is completed and is then filtered. The residue is rapidly fractionally distilled under reduced pressure to yield divinylarsenic chloride.

Example 14

To one mole of arsenic trichloride in heptane is slowly added one mole of vinylmagnesium chloride in tetrahydrofuran. The mixture is stirred until the reaction is completed and is then filtered. The solvents are removed from the filtrate by distillation. The residue is rapidly fractionally distilled under reduced pressure to yield vinylarsenic dichloride.

Example 15

To one mole of vinylarsenic dichloride in pentane is added one mole of butylmagnesium chloride in tetrahydrofuran. The mixture is gently stirred until the reaction is completed and is then filtered. The solvents are removed from the filtrate by distillation. The residue is rapidly fractionally distilled under reduced pressure to yield vinylbutylarsenic chloride.

Example 16.—Trivinylantimony

In a 5 liter flask was placed 152.1 grams (0.667 mole) of antimony trichloride in 1600 ml. of tetrahydrofuran. A solution of 2.63 moles of vinylmagnesium chloride in tetrahydrofuran was then added fairly rapidly and the reaction mixture refluxed from the addition. When 1.8 moles of vinylmagnesium chloride in the tetrahydrofuran had been added, addition was stopped and the mixture was refluxed for half hour. The addition was then continued until 2.2 moles of vinylmagnesium chloride in tetrahydrofuran had been added. The mixture was refluxed for an additional hour. The addition was completed when 2.36 moles of vinylmagnesium chloride had been added. It was then allowed to reflux for three hours, and then allowed to stand overnight. The reaction mixture was hydrolyzed and the organic layer separated. Four hundred ml. of pentane was added to the organic layer which was then dried and washed. The aqueous layer was acidified and extracted with 200 ml. of pentane to extract the organic matter. The organic layers were combined, dried, and distilled. Trivinylantimony was obtained.

Example 17

Following the procedure of Example 16, 1-buten-1-yl-magnesium chloride was reacted with $SbCl_3$ to yield tris-1-buten-1-ylstibine.

Example 18

To one mole of ethylantimony dichloride in cyclohexane solution is slowly added two moles of vinylmagnesium chloride in tetrahydrofuran, at reflux. After completion of the addition, the reaction mixture is refluxed, cooled, hydrolyzed, and the organic matter separated. Divinylethylstibine is recovered from the organic material.

Example 19

To one mole of cyclopentylantimony dichloride in heptane solution is slowly added two moles of vinylmagnesium chloride in tetrahydrofurfuryl ethyl ether, at reflux. After completion of the addition, the reaction mixture is refluxed, cooled, hydrolyzed, and the organic matter separated. Divinylcyclopentylstibine is recovered from the organic material.

Example 20

To one mole of dimethylantimony chloride in hexane solution is slowly added one mole of vinylmagnesium chloride in dihydropyran, at gentle reflux. After additional reflux, the reaction mixture is cooled, hydrolyzed, and the organic material separated. Vinyldimethylstibine is recovered from the organic material.

Example 21

To one mole of dilaurylantimony chloride in hexane solution is slowly added one mole of vinylmagnesium chloride in tetrahydrofuran, at gentle reflux. After additional reflux, the reaction mixture is cooled, hydrolyzed, and the organic material separated. Vinyldilaurylstibine is recovered from the organic material.

Example 22

To one mole of diphenylantimony chloride in hexane solution is slowly added one mole of vinylmagnesium chloride in tetrahydrofuran, at gentle reflux. After additional reflux, the reaction mixture is cooled, hydrolyzed, and the organic material separated. Vinyldiphenylstibine is recovered from the organic material.

Example 23

To one mole of dinaphthylantimony chloride in benzene solution is added one mole of 1-propenylmagnesium chloride in tetrahydrofuran. After completion of the addition reflux is continued and then the reaction mixture cooled, hydrolyzed, and the organic material separated. 1-propenyldinaphthylstibine is recovered from the organic material.

Example 24

To one mole of 5-chlorothienylantimony dichloride in toluene is added two moles of vinylmagnesium chloride in tetrahydrofuran, while maintaining gentle reflux. Reflux is continued after addition followed by cooling, hydrolyzing, and the separation of the organic material. Divinyl-5-chlorothienylstibine is recovered from the organic material.

Example 25

To one mole of di-o-tolylantimony chloride in benzene is added one mole of 1-cyclohexen-1-yl magnesium chloride in tetrahydrofuran. After completion of the addition, the reaction mixture is refluxed, cooled, hydrolyzed, and the organic material separated. Cyclohexenyldi-(o-tolyl)stibine is recovered from the organic material.

Example 26

To one mole of di-p-anisylantimony chloride in benzene solution is slowly added one mole of 4-methyl-1-penten-2-ylmagnesium chloride in tetrahydrofuran. The reaction mixture is additionally refluxed, cooled, hydrolyzed, and the organic material separated. 4-methyl-1-penten-2-yl di-(p-anisyl)stibine is recovered from the organic material.

Example 27

To one mole of antimony tribromide in heptane is slowly added two moles of vinylmagnesium chloride in tetrahydrofuran. The mixture is stirred until the reaction is complete and then filtered. The solvents are removed from the filtrate by distillation. The residue is rapidly fractionally distilled under reduced pressure to yield divinylantimony bromide.

Example 28

To one mole of antimony trichloride in heptane is slowly added one mole of vinylmagnesium chloride in tetrahydrofuran. The mixture is stirred until the reaction is complete and then filtered. The solvents are removed from the filtrate by distillation. The residue is rapidly fractionally distilled under reduced pressure to yield vinylantimony dichloride.

Example 29

To one mole of vinylantimony dichloride in tetrahydrofuran is added one mole of butylmagnesium chloride in tetrahydrofuran. The mixture is gently stirred until the reaction is complete and then filtered. The solvents are removed from the filtrate by distillation. The residue is rapidly fractionally distilled under reduced pressure to yield vinylbutylantimony chloride.

Example 30

To one mole of vinylantimony dichloride in tetrahydrofuran is added one mole of m-fluorophenyl magnesium chloride in tetrahydrofuran. The mixture is gently stirred until the reaction is complete and then filtered. The solvents are removed from the filtrate by distillation. The residue is rapidly fractionally distilled under reduced pressure to yield vinyl-m-fluorophenylantimony chloride.

Example 31.—Tris(1-buten-1-ylarsine)

Four (4) moles of 1-buten-1-ylmagnesium chloride tetrahydrofuran complex in tetrahydrofuran is slowly added to one (1) mole of $AsCl_3$ dissolved in heptane. Water is added to dissolve the $MgCl_2$ product. The organic layer is separated and filtered and the solvents are removed by distillation. The product is separated by recrystallization from xylene.

Example 32.—Tris(1-buten-1-ylstibine)

The procedure of Example 31 is followed except that $SbCl_3$ is used in place of $AsCl_3$ of Example 31. Tris-(1-buten-1-ylstibine) is recovered.

The compounds of the present invention are biocidally active and are useful as insecticides, antiseptics and as slimicides particularly in paper manufacturing processes. They are also useful as components of polymers. They are polyfunctional and are active as cross-linking agents. They may be copolymerized with such compounds as styrene, vinyl acetate, vinyl chloride, butadiene, acrylates, esters, acrylics, and other vinylated metals such as vinyltins, vinylborons, vinylsilanes, vinyl arsenics, vinyl phosphorus, vinyl antimony, etc. to yield polymers having a high metal or metalloid content which may be used in the plastic fabricating industries as well as in other industries.

Throughout the application the vinylic magnesium chlorides have been designated as such. When the magnesium chloride compounds are prepared in the presence of compound Q, defined herein, the vinylicmagnesium chloride compounds may take the form of a complex with compound Q, ViMgCl·nQ, wherein Vi and Q are defined above and n is a small indeterminate whole number in the order of 1, 2 or 3.

While the invention has been described with particular reference to specific embodiments, it is to be understood that it is not limited thereto but is to be construed broadly and restricted solely by the scope of the appended claims.

What is claimed is:

1. As a composition of matter a compound having the formula $$(Vi)_n(R)_aMX_{3-(n+a)}$$

wherein R is a hydrocarbon radical, M is selected from the class consisting of arsenic and antimony, X is halogen, n is an integer from 1 to 3, a is a whole number from 0 to 2 and (n+a) is not greater than 3, and Vi is a vinylic radical having up to six carbon atoms and bonded to M through an ethylenically unsaturated carbon atom and having the general formula

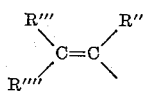

wherein R″, R‴ and R″″ are selected from the class consisting of hydrogen atoms and hydrocarbon radicals.

2. A composition of matter according to claim 1 wherein R has up to 18 carbon atoms and a is an integer from 1 to 2.

3. As a composition of matter a compound having the formula

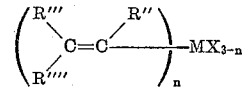

wherein R″, R‴ and R″″ are selected from the class consisting of hydrogen atoms and hydrocarbon radicals having a total of up to 4 carbon atoms, M is selected from the class consisting of arsenic and antimony, X is a halogen atom, and n is an integer from 1 to 3.

4. A composition of matter according to claim 3 wherein R″, R‴, and R″″ are hydrogen atoms.

5. A composition of matter according to claim 4 wherein X is chlorine.

6. Divinylarsenic chloride.
7. Vinylarsenic dichloride.
8. Divinylantimony chloride.
9. Vinylantimony dichloride.
10. Trivinylarsenic.
11. Trivinylantimony.

References Cited in the file of this patent

UNITED STATES PATENTS

| | | |
|---|---|---|
| 2,082,568 | Carothers | Jan. 1, 1937 |
| 2,272,133 | Shappirio | Feb. 3, 1942 |

OTHER REFERENCES

Rueggeberg et al.: 68 Jour. Am. Chem. Soc., pp. 1860–1862, 1946.

Beilstein's: Handbuch der Org. Chem., 4th ed., vol. 4, 1922, page 606.

Gryszkiewicz-Trochimowski: Chem. Abst., vol. 21, 1927, page 3612.

Das Gupta—Jour. Indian Chem. Soc., vol. 12, pp. 627–8 (1935).

Chem. Soc. Journal (London), 1947, part II, page 1446.